UNITED STATES PATENT OFFICE.

MATTHEW C. JAQUET, OF OMAHA, NEBRASKA, ASSIGNOR OF ONE-HALF TO WILLIAM W. POWERS, OF CHICAGO, ILLINOIS.

BASE FOR PAINT AND THE LIKE.

No. 837,684.     Specification of Letters Patent.     Patented Dec. 4, 1906.

Application filed February 6, 1906. Serial No. 299,782.

*To all whom it may concern:*

Be it known that I, MATTHEW C. JAQUET, a citizen of the United States, residing at Omaha, Douglas county, Nebraska, have invented a new and useful Base for Paint and the Like, of which the following is a specification.

My invention consists in the production of a new composition of matter which is a base for paints and the like used for the same general purposes and with the same general results as white lead and adapted to be employed as a substitute for such white lead or to be intermixed therewith, as may be desired. My base when used as a substitute for white lead may be employed alone and mixed with a suitable paint vehicle, such as linseed-oil, or may be mixed with zinc oxid, thereby producing new composition of matter. Moreover, the zinc oxid may also be incorporated with my base and the white lead when the latter two ingredients are used together.

I have made the discovery that pulverized mussel-shells—such as clam-shells of the fresh-water variety, for instance—possess the necessary properties or attributes to form one of the principal constituents or ingredients for a base for paint and the like, the other ingredient being a paint vehicle, preferably linseed-oil, as usual, such shells comprising on analysis a considerable proportion of carbonate of calcium, a less proportion of silicate of magnesia, and a much less proportion of organic matter, all of which substances have been found by me to possess the necessary properties to constitute a base for paint and the like when mixed with a suitable oil, such as linseed-oil or its equivalent.

My new composition of matter thus comprises pulverized mussel-shells of the fresh-water species, a paint vehicle, such as linseed-oil or its equivalent, the shells being crushed, ground, and otherwise treated, as hereinafter described, and then mixed with the linseed-oil, in which mixture may be incorporated a suitable proportion of white lead or zinc oxid, or both, as hereinbefore suggested and as hereinafter more particularly explained. The resulting base is not only equal in quality and properties to the white lead, but is much more economically produced, especially as the mussel-shells, which provide the main ingredient of my base, are comparatively inexpensive.

It will be understood that my present invention relates to a product or new article of manufacture and that the particular process by which such product may be obtained is immaterial; but for the sake of a clear and definite description of my invention I will now proceed to describe a suitable process.

In practice the shells are run through a suitable crusher, which serves to break up the shells into small pieces, but not to pulverize them. The crushed shells are now introduced into a rotatable cylinder into which water is run, with the result that the organic matter on the outside or so-called "whirl" of the shells is removed. The shells are now run through a finer crusher or grinder, which pulverizes them, after which the pulverized mass or material is introduced into an ordinary cylinder-bolter similar to a bran-bolter. After passing through the bolter the material is introduced into any suitable mixer capable of stirring and agitating any substance introduced for a thorough mixing thereof. At this stage in the process a suitable amount of linseed-oil or its equivalent is introduced, and according to present practice the following proportions are employed, to wit: shells, 92.5 per cent.; linseed-oil, 7.5 per cent. As the final step of the process the mass or material after being thus thoroughly mixed is ground to the proper fineness by being passed through a suitable grinding-mill, such as an ordinary paint-mill.

The product resulting from this process is a white mass similar to the ordinary white lead in general appearance and capable of serving as a substitute therefor.

As hereinbefore stated, my base may be mixed or incorporated with the ordinary white lead, in which event I prefer to leave the percentage of linseed-oil the same as when used alone with the shells and to divide up the remaining percentage between the shells and the white lead, preferably or approximately in the proportion of seventy-five per cent. of shells to 17.5 per cent. of white lead. Also, as hereinbefore stated, it may be found desirable to incorporate zinc oxid with the pulverized shells and the linseed-oil, in which event I prefer to mix said ingredients in the following proportions, to wit: shells, sixty-five per cent.; zinc oxid, twenty-five per cent., and linseed-oil, ten per cent.

It will be understood that by preference and as the preferred final step in the process the mass or material after being mixed as above described is thoroughly ground, so as to reduce the same to considerable fineness, the same being passed through an ordinary paint-mill or the like.

I claim—

1. As a new composition of matter, a base for paints and the like comprising pulverized mussel-shells and a suitable paint vehicle.

2. As a new composition of matter, a base for paints and the like comprising pulverized mussel-shells and linseed-oil.

3. As a new composition of matter, a base for paints and the like comprising pulverized clam-shells and a suitable paint vehicle.

4. As a new composition of matter, a base for paints and the like comprising pulverized clam-shells and linseed-oil.

5. As a new composition of matter, a base for paints and the like comprising pulverized mussel-shells, a suitable paint vehicle and zinc oxid.

6. As a new composition of matter, a base for paints and the like comprising pulverized mussel-shells, linseed-oil and zinc oxid.

7. As a new composition of matter, a base for paints and the like comprising pulverized mussel-shells, substantially sixty-five per cent., linseed-oil, substantially ten per cent. and zinc oxid, substantially twenty-five per cent.

8. As a new composition of matter, a base for paints and the like comprising pulverized mussel-shells, linseed-oil, white lead and zinc oxid.

MATTHEW C. JAQUET.

Witnesses:
S. E. HIBBEN,
LOUIS B. ERWIN.